(12) United States Patent
Wallace, Jr. et al.

(10) Patent No.: US 11,195,452 B1
(45) Date of Patent: Dec. 7, 2021

(54) SUB-FRAME SYNCHRONIZATION OF MULTIPLE DISPLAYS WITH INDEPENDENT VERTICAL REFRESH RATES

(71) Applicant: Cisco Technology, Inc., San Jose, CA (US)

(72) Inventors: Charles Robert Wallace, Jr., Buford, GA (US); Jordan Moussalli, New York, NY (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/992,404

(22) Filed: Aug. 13, 2020

Related U.S. Application Data

(60) Provisional application No. 63/024,636, filed on May 14, 2020.

(51) Int. Cl.
| | |
|---|---|
| *G09G 3/20* | (2006.01) |
| *G06F 3/14* | (2006.01) |
| *G06F 3/147* | (2006.01) |
| *H04L 29/06* | (2006.01) |

(52) U.S. Cl.
CPC ............ *G09G 3/2092* (2013.01); *G06F 3/147* (2013.01); *G06F 3/1446* (2013.01); *H04L 65/601* (2013.01); *G09G 2300/026* (2013.01); *G09G 2310/08* (2013.01); *G09G 2370/022* (2013.01)

(58) Field of Classification Search
CPC .................................................... G06F 3/1446
See application file for complete search history.

(56) References Cited

U.S. PATENT DOCUMENTS

| | | | |
|---|---|---|---|
| 8,264,421 | B2 | 9/2012 | Kamada et al. |
| 8,704,732 | B2 | 4/2014 | Pourbigharaz et al. |
| 10,095,460 | B2 | 10/2018 | Choi |
| 2014/0111530 | A1 | 4/2014 | Choi |
| 2020/0143772 | A1 | 5/2020 | Huang et al. |

OTHER PUBLICATIONS

Tang, Jeremy, "A Measurement Study of Vertical Synchronization Configurations in PC Video Games.", http://www.cse.wustl.edu/~jain/cse567-15/ftp/vsync/index.html, May 1, 2015, 9 pages.
Nam, Sungwon et al., "Multiapplication, Infertile Synchronization on Ultra-High-Resolution Display Walls", MMSys'10, Feb. 22-23, 2010, 12 pages.

(Continued)

*Primary Examiner* — Gustavo Polo
(74) *Attorney, Agent, or Firm* — Edell, Shapiro & Finnan, LLC

(57) ABSTRACT

Presented herein are techniques to retain full resolution across all screens of a video wall and achieve perfect visual synchronization (sync), such that all screens in a video wall configuration act and look like a single screen. In one form, a system is provided that includes a plurality of displays being arranged in one or more adjacent vertical columns, and a plurality of media players. Each media player of the plurality of media players is coupled to a corresponding display of the plurality of displays and is configured to play out a corresponding positional subset of an overall media content, with a corresponding delay, to the corresponding display arranged in the one or more adjacent vertical columns to compensate for scan out lag associated with the media content.

20 Claims, 12 Drawing Sheets

(56) References Cited

OTHER PUBLICATIONS

Kumar, A., "What are genlock, framelock, & timecode sync and when do I need them?", https://newsandviews.dataton.com/genlock-framelock-timecode-sync-when-do-i-need-them, Sep. 27, 2018, 6 pages.
NVIDIA Corporation, "Video Wall Synchronization with Quadro Sync", https://www.nvidia.com/en-us/design-visualization/solutions/quadro-sync/, downloaded Aug. 13, 2020, 5 pages.
NVIDIA Corporation, "Quadro Sync", User's Guide, DU-06574-001_v01, Oct. 16, 2012, 36 pages.
NVIDIA Corporation, "Quadro Sync II", User's Guide, DU-08348-001_v01, Dec. 14, 2016, 40 pages.

| | 310(1) | 310(2) | 310(3) |
|---|---|---|---|
| NO PLAY OUT DELAY | A1 | A2 | A3 |
| | 312(1) | 312(2) | 312(3) |
| 1 REFRESH CYCLE PLAY OUT DELAY | B1 | B2 | B3 |
| | 314(1) | 314(2) | 314(3) |
| 2 REFRESH CYCLES PLAY OUT DELAY | C1 | C2 | C3 |

SUB-FRAME SYNCHRONIZATION OF MULTIPLE DISPLAYS WITH INDEPENDENT VERTICAL REFRESH RATES

CROSS REFERENCE TO RELATED APPLICATION

This application claims priority to U.S. Provisional Application No. 63/024,636, filed May 14, 2020, the entirety of which is incorporated herein by reference.

TECHNICAL FIELD

The present disclosure relates to video display techniques.

BACKGROUND

Video displays and televisions draw a picture on the screen one pixel at a time horizontally from left to right, then line by line vertically, from top to bottom. For a 60 Hz 1920×1080p display screen refresh rate, it takes ⅟60 sec or 16.666 msec (ms) to scan the entire frame and 0.0154 ms for a line. The granularity that effects the scanout lag for is associated with the time it takes to draw a line.

BRIEF DESCRIPTION OF THE DRAWINGS

FIG. 8 is a diagram showing in a 3×3 display wall the techniques for correcting for scan out lag by delaying the playout of content, according to an example embodiment.

DESCRIPTION OF EXAMPLE EMBODIMENTS

Overview

Presented herein are techniques to retain full resolution across all screens of a video wall and achieve perfect visual synchronization (sync), such that all screens in a video wall configuration act and look like a single screen. In one form, a system is provided that includes a plurality of displays being arranged in one or more adjacent vertical columns, and a plurality of media players. Each media player of the plurality of media players is coupled to a corresponding display of the plurality of displays and is configured to play out a corresponding positional subset of an overall media content at a full resolution of the media content and such that collectively the plurality of displays display the overall media content as a single display. Further, each of the plurality of media players is configured to play out the corresponding positional subset of the media content, with a corresponding delay, to the corresponding display arranged in the one or more adjacent vertical columns to compensate for scan out lag associated with the media content. In one form, the corresponding delay may be $(((1/fps)*(n-1))*1000)$, where n is a vertical position number of a display in the one or more adjacent vertical columns from top to bottom, and fps is a frame refresh rate of the media content.

Example Embodiments

Figure 1:
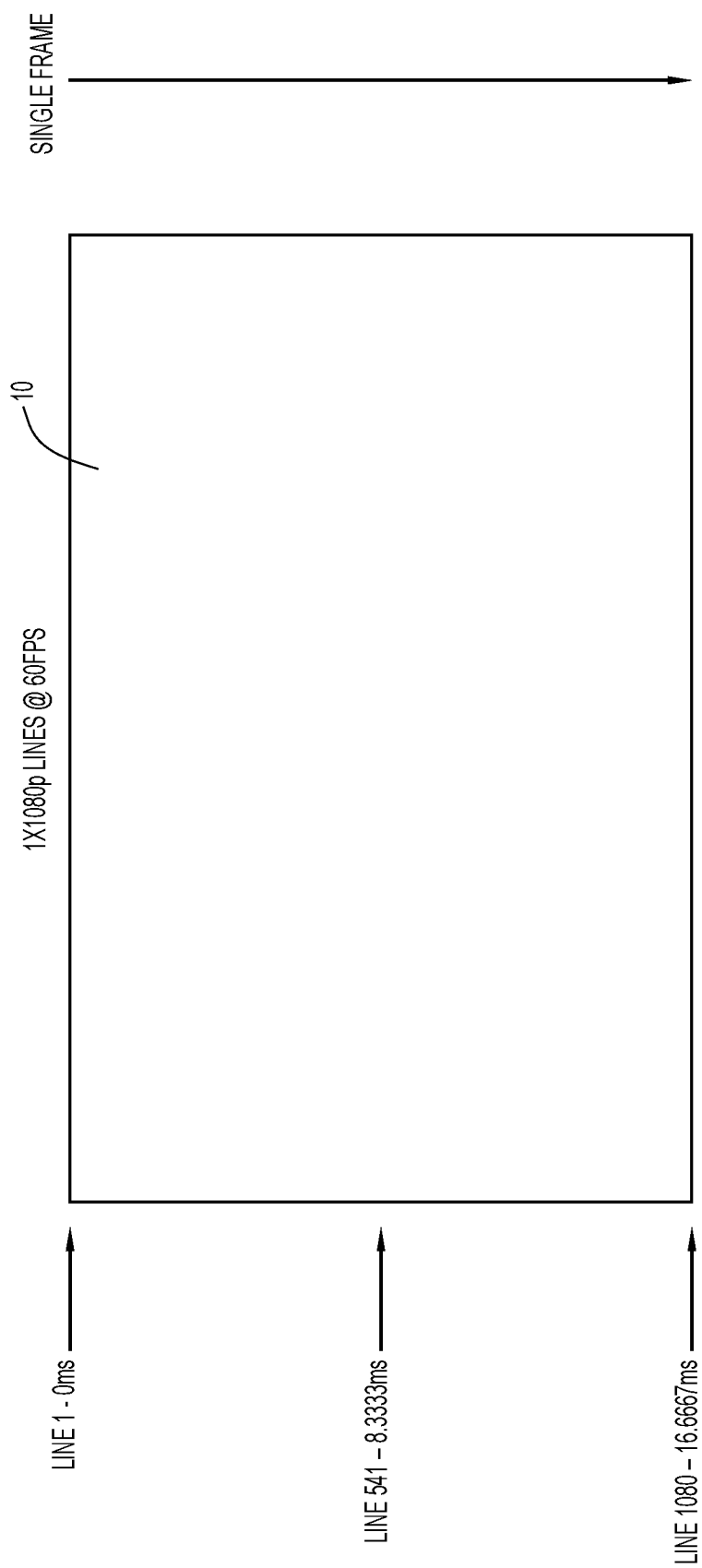
FIG. 1 is a diagram shown scanout lag associated with a single video display screen.

A source video frame may have a frame rate (also called frame refresh cycle), denoted by frames per second (fps). For example, a source video frame rate may be 60 fps (⅟60). A new frame is provided every 16.67 ms. The source video line refresh rate may be (⅟60)/1080 for a 1080p video stream. A new video line is provided every 0.015432 ms. The standard television (TV) frame rate is 60 Hz. This changes over time, as it was 30 Hz, and in the future, there will be a shift to 120 Hz and 240 Hz. The display line refresh rate is the same as the video refresh rate. Thus, there is a scanout lag of one line per 0.015432 ms for a 60 Hz frame rate. Lines are drawn on a television screen (video screen) from top to bottom as part of a vertical refresh process. As an example, the display scanout lag for a 60 Hz 1080p video display is 16.6667 ms. That is, the time between the scan out of line 1 and the scanout of line 1080 is 16.6667 ms. This is shown in FIG. 1 for a single video frame 10.

Figure 2:
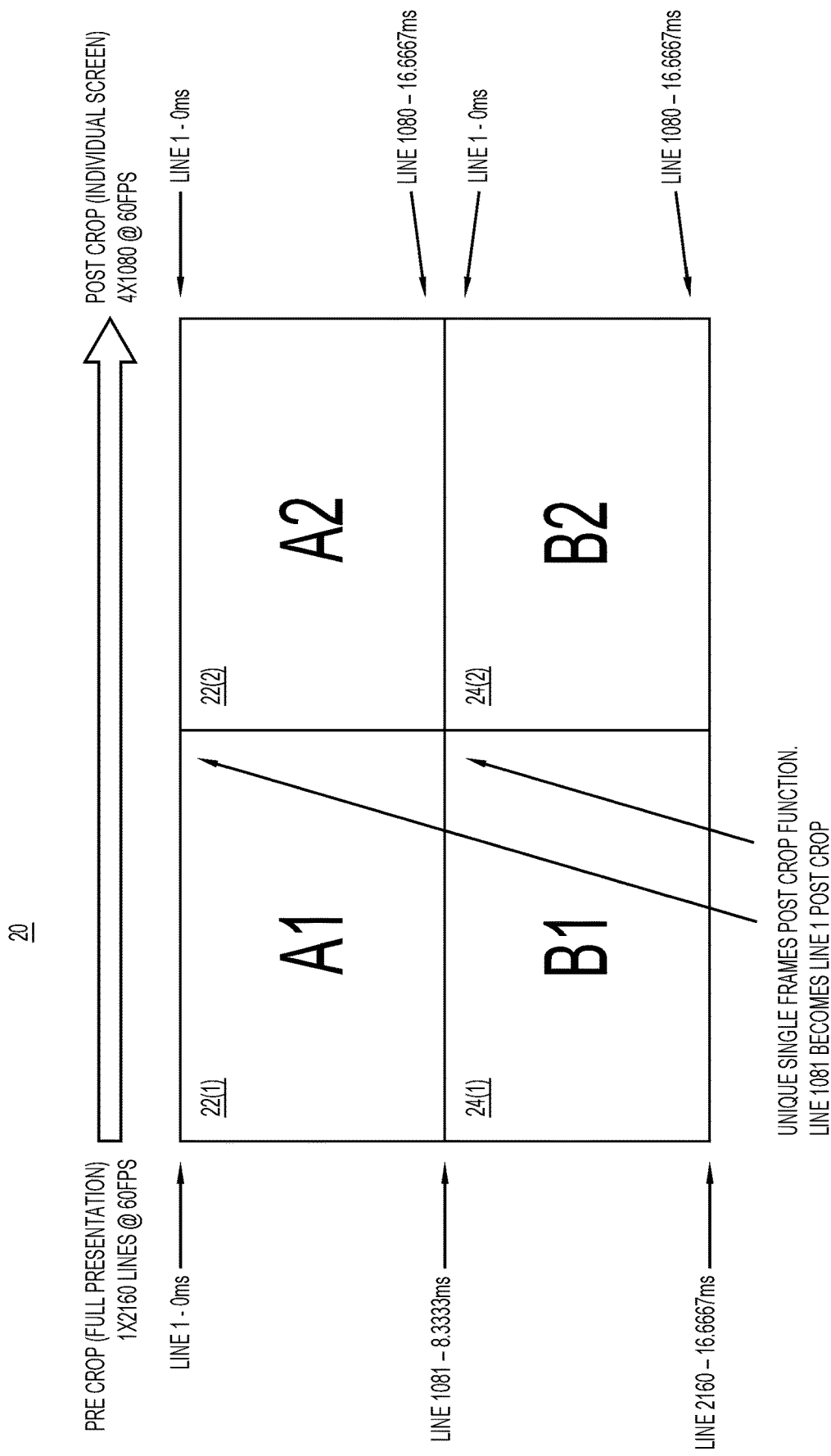
FIGS. 2 and 3 is a diagram showing scanout lag in a video wall consisting of four video display screens.

Video displays and televisions draw a picture on the screen one pixel at a time horizontally from left to right, then line by line vertically, from top to bottom. Consider a video wall or array 20 having 4 televisions or video displays arranged in rows, where a top row consists of displays 22(1) and 22(2) (denoted A1 and A2, respectively, and bottom row of video displays 24(1) and 24(2) (denoted B1 and B2, respectively) arranged as shown in FIG. 2. The array is displaying a single presentation, such that A1A2B1B2 complete a single video presentation, where a disjointed update can be problematic.

Figure 3:
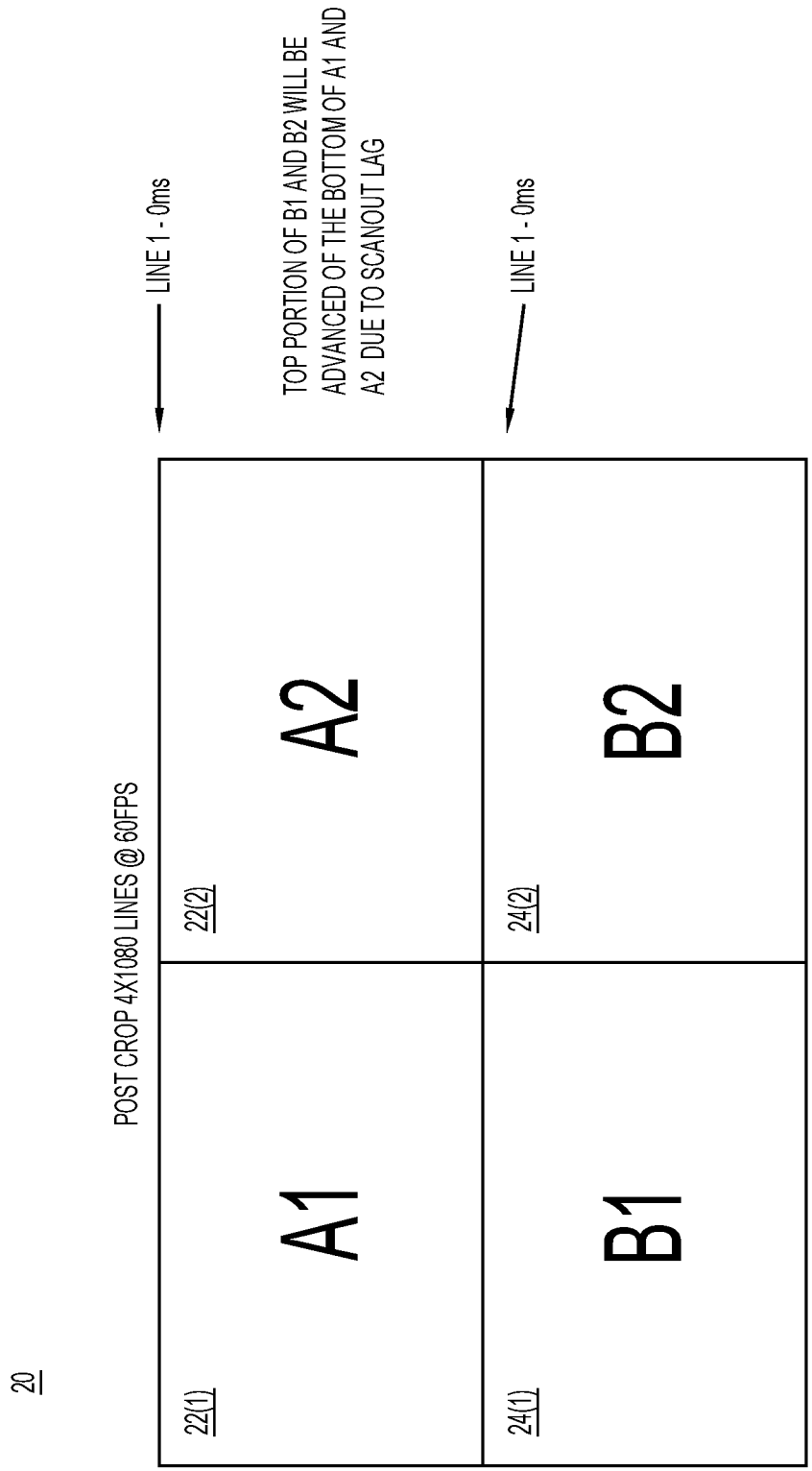

When video display screens are stacked on top of each other, the last row of pixels on the top screen (A1) and the first row of pixels on the screen below it (B1) have the greatest difference in update interval and are therefore updating one (1) frame out of sync. This causes the overall presentation to look disjointed and appear visually out of sync. This is shown in FIG. 3 for post cropped video, exhibiting time offset due to scanout lag.

Figure 4:
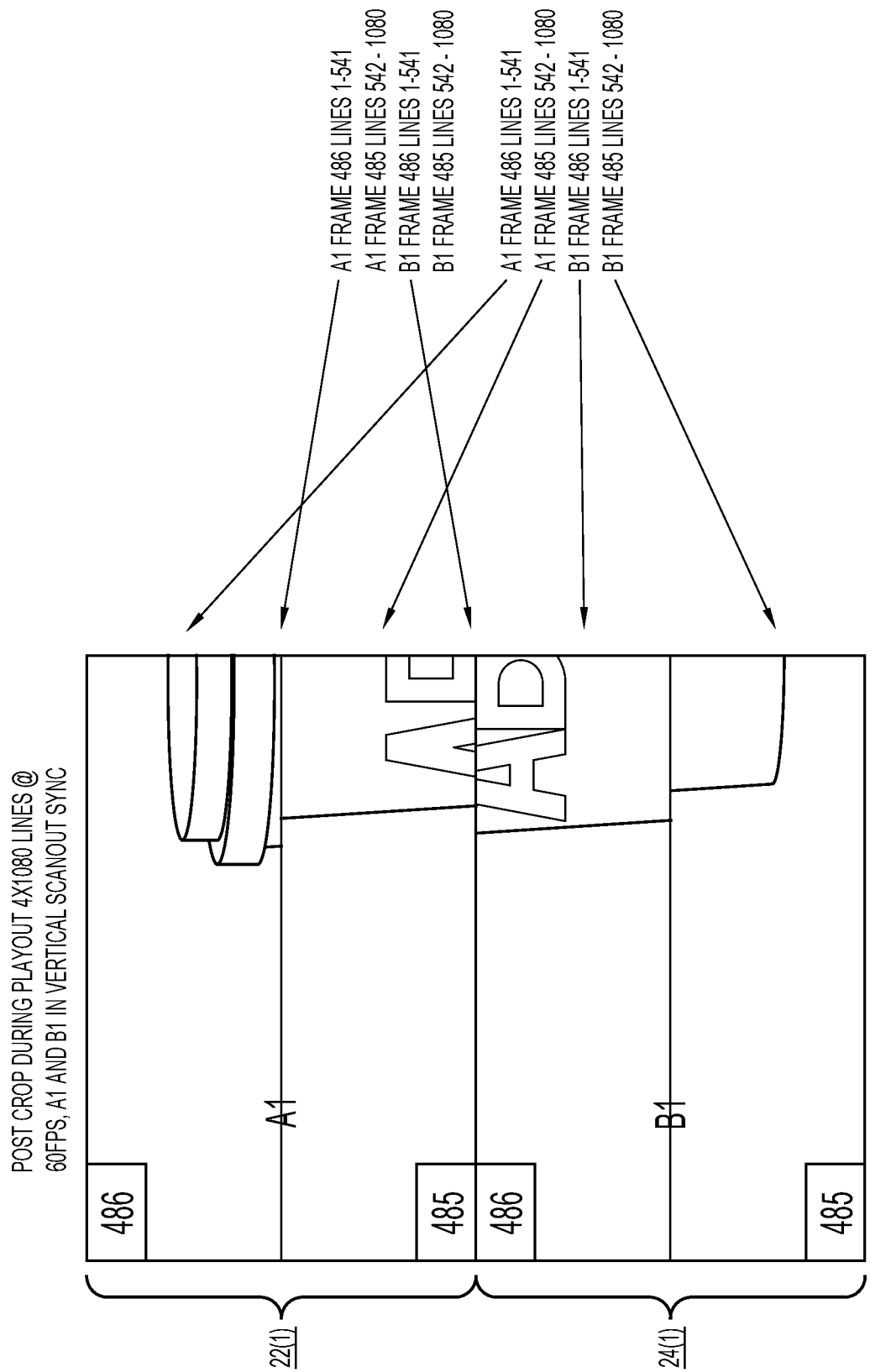
FIG. 4 is a diagram showing a more detailed example of scanout lag in a video wall of two video display screens.

FIG. 4 illustrates scanout lag with cropped video on a video wall. FIG. 4 is a representation at the midpoint of the ⅟60 refresh cycle to give context to the point in time FIG. 4 was referenced. It should be understood as well that video display screens A2 and B2 (as shown in FIG. 3) are not shown in the FIG. 4. Only display screens 22(1) and 24(1), A1 and B1, are shown. That is, FIG. 4 shows ½ of a 2×2 video wall, for simplicity.

While FIG. 4 and several other figures reference 4×1080 (displays x resolution/display), it should be understood that it is actually 2×1080 lines in a 2×2 video wall configuration, although there are 4×1080 TV's or display screens. Display B1 starts showing frame 486 from the top and slowly replaces the lines that were drawn from frame 485 from the top down. For example, line 1 is drawn at the same time on video display screens A1 and A2, and line 1 is drawn at the same time on video display screens B1 and B2. There are technically 4×1080 lines, but because video display screens A1 and A2, and video display screens B1 and B2 lines are rendered at the same time, there is a distinction.

Figure 5:
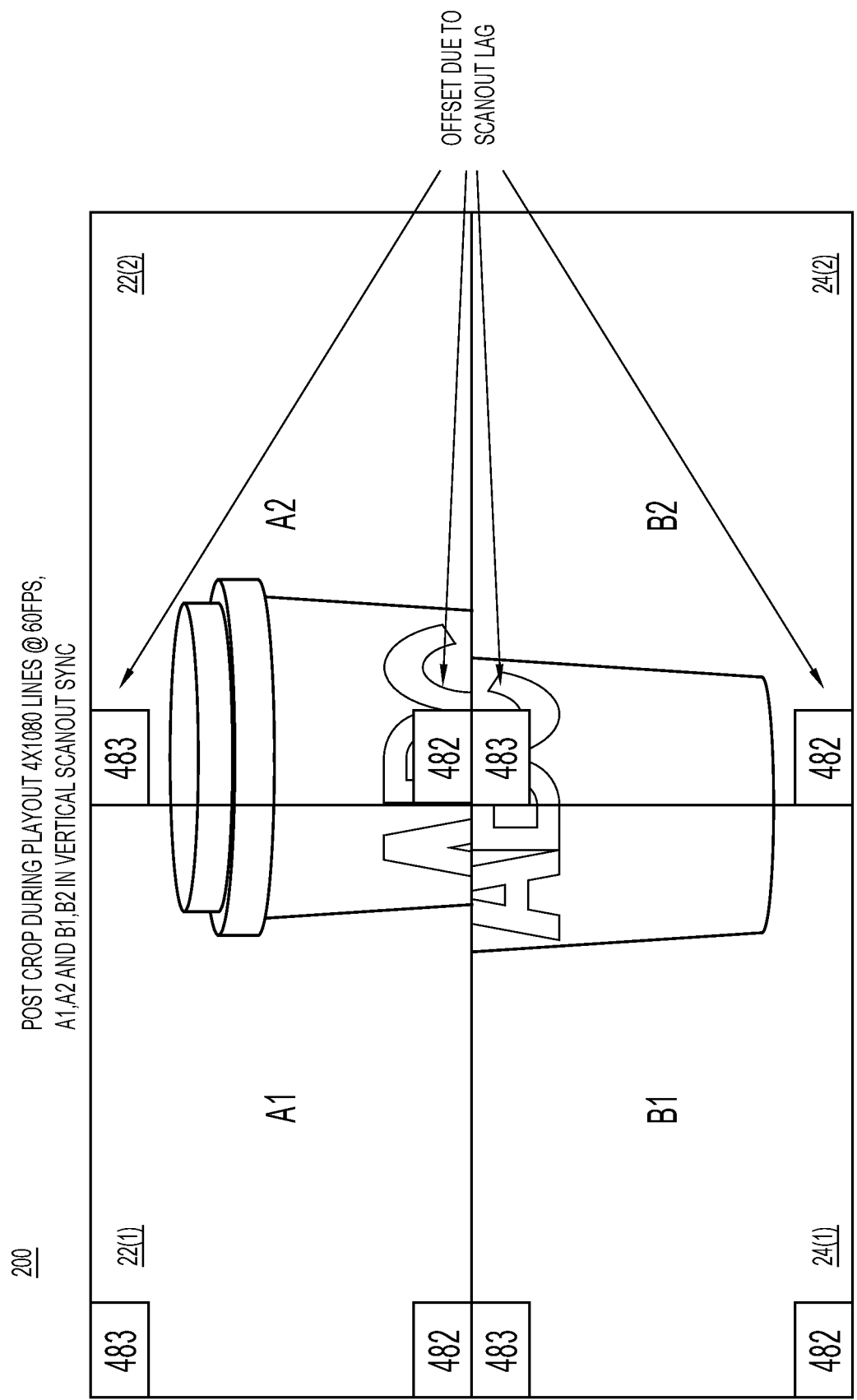
FIG. 5 is a diagram shows a more detailed example of scanout lag in a video wall of four video display screens.

FIG. 5 illustrates scanout lag on video wall 20, and the actual appearance of the video during scan out. In FIG. 5, the same frame has two different counter values due to scanout lag. The top and bottom lines of display A2 has different frame number values (frame numbers 482 and 483), and the same occurs for display B2. The bottom-most line of display A2, and top-most line of display B2 are subsequently one frame off due to scanout lag.

This issue becomes more apparent the more screens there are in a vertical array (A, B, C, etc.). This presents itself as breaks or tears in the content from vertical screens and is most apparent with fast moving content with vertical lines traversing horizontally. This is due to the bottom of screen A1 updating at the end of the refresh cycle and the top of B1 refreshing at the beginning, for example. Proprietary "tile matrix" display technology may be used to achieve screen-to-screen sync to preserve overall resolution of the source video (i.e., prevent down scaling).

However, existing technologies have not been able to achieve perfect visual sync for non-proprietary implementations where each video player independently renders video to a single display monitor. Non-proprietary implementations essentially scale the image and come at the cost of loss of resolution.

Because each display has its own vertical temporal refresh period, there is temporal delay in drawing each line, i.e., line 1 is drawn before line 540 and line 1080 is the last line o be drawn before line 1 is drawn again in the next cycle.

There is no current way to compensate for the fact that line 1 will always be 1 frame ahead of line 1080 (or whatever the last line in the display is). No solution exists to compensate for this lag which is referred to as "scanout lag". In high motion video, the alignment of screens where they meet would be off by 1 vertical refresh cycle from the adjoining top or bottom screen.

Figure 6:
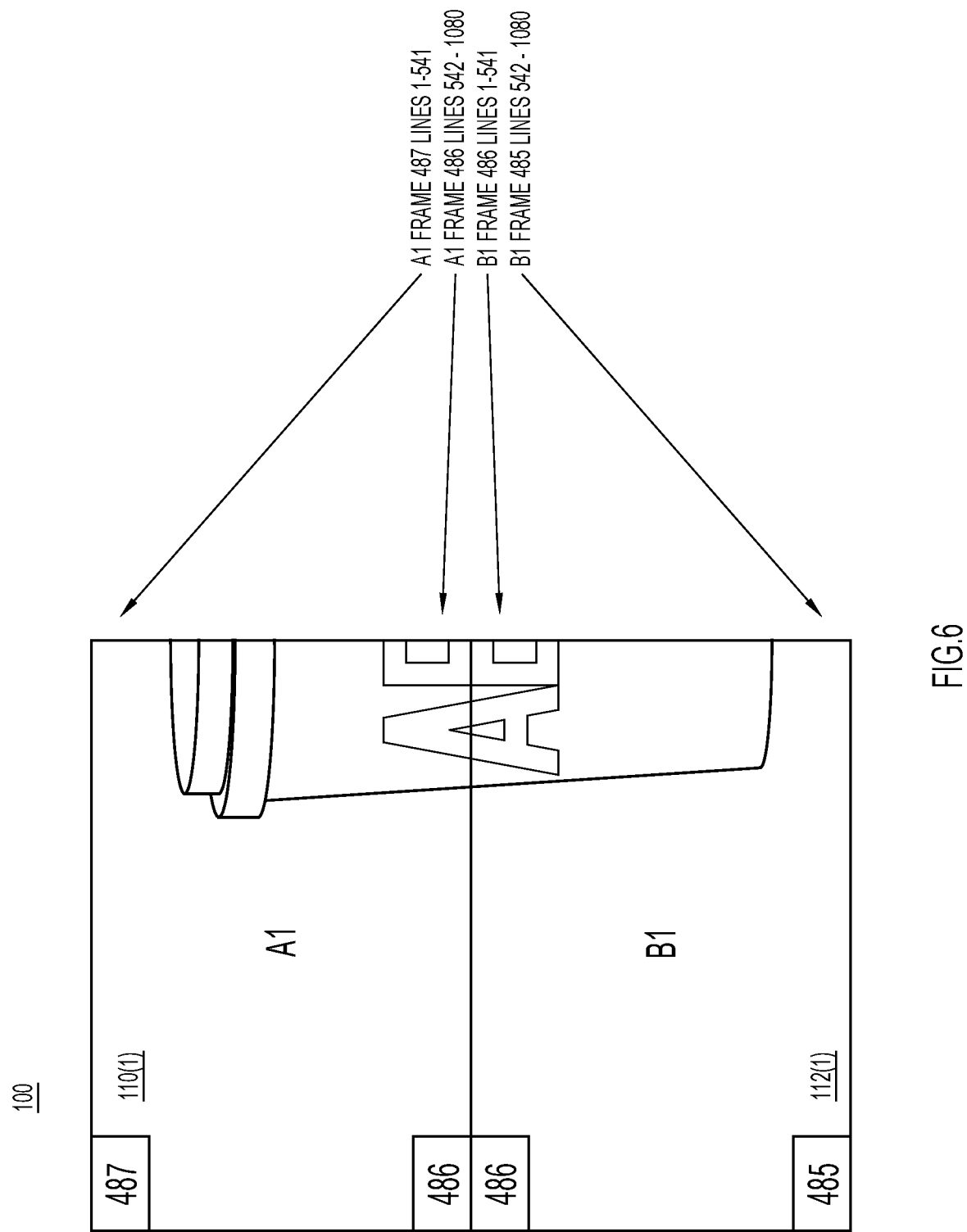
FIG. 6 is a diagram showing a technique in a two video display screen video wall for correcting for scan out lag by delaying the playout of content, according to an example embodiment.

Accordingly, presented herein are techniques for achieving sync by adding independent delay to each display's content (or playout) so that where displays vertically adjoin, there is delay added to compensate for the scanout lag. FIG. 6 is a simplified diagram of a two-display video wall 100 comprising display 110(1) (denoted A1) and display 112(1) (denoted B1). It should be understood that video display screens A2 and B2 (of FIG. 5) may be part of the configuration shown in FIG. 6, but are omitted for simplicity.

In this simple example, there are only two displays vertically arranged. Therefore, delaying the playout to the lower display screen B1 by an amount of time equal to playing (scanning) out one frame at the, from top to bottom, achieves a visual illusion of a more synchronous video playout because where two displays (the bottom of display screen A1 and the top of display screen B1) meet, the image is aligned. Distortion may be present with motion from right to left and may give an effect of the image slanting to the left with motion (frames are staggered). Motion blur and ghosting may help to mask such distortion effects.

More specifically, as shown in the example of FIG. 6, at the time that video for frame number 486 of A1 content is played out through lines 542-1080 of display A1, frame 486 of B1 content is being played out through lines 1-541 of display B1. As a result, the image at the junction of displays A1 and B1 is for the same frame number (frame 486) as opposed to lines from two different frame numbers (as shown in FIG. 4). In FIG. 6, frames 487 and 486 and frames 486 and 485 are overlayed at 50% scanout. In other words, content supplied to display A1 is one frame advanced.

Figure 7:
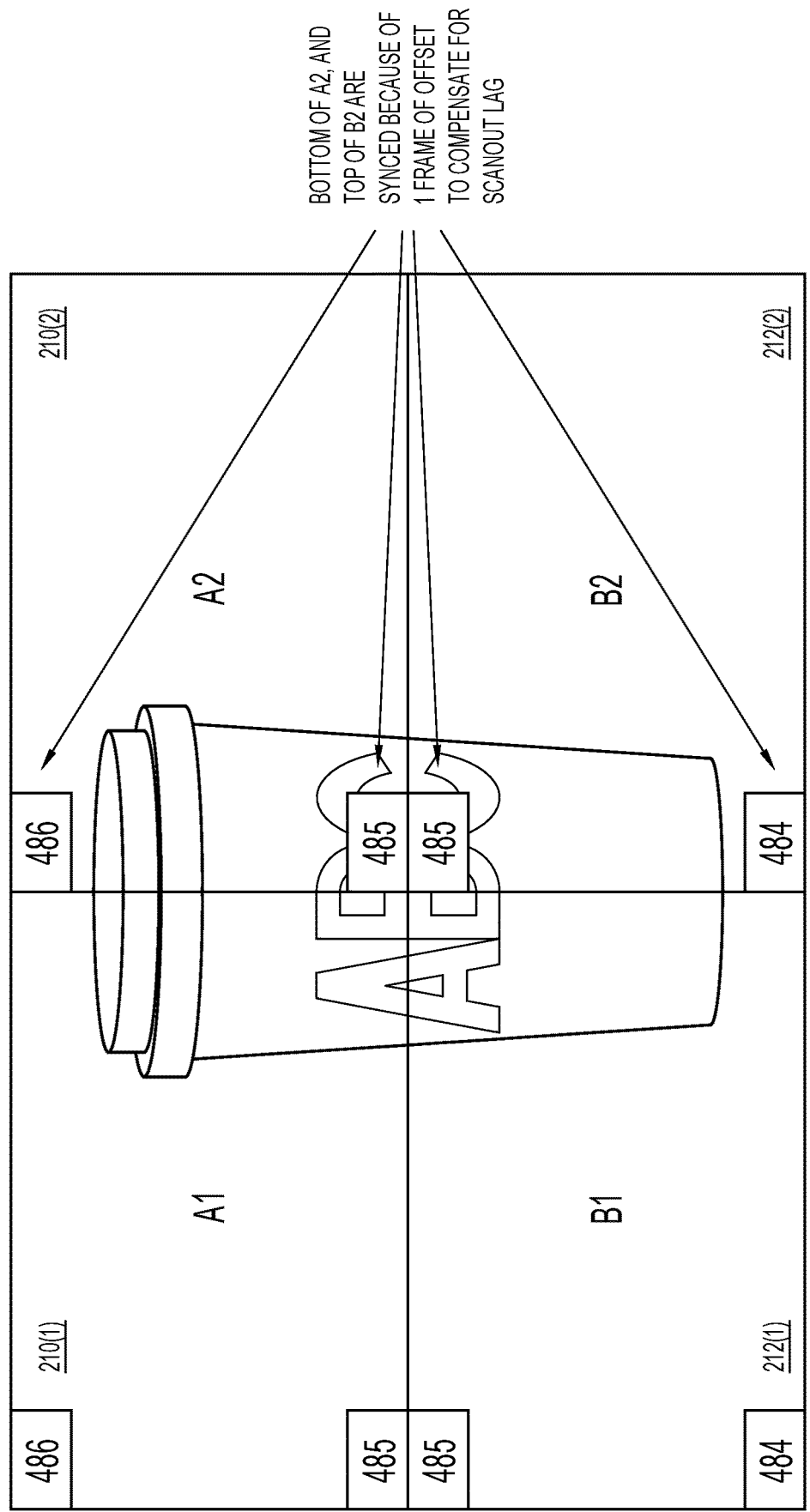
FIG. 7 is a diagram showing in a 2×2 display wall the techniques for correcting for scan out lag by delaying the playout of content, according to an example embodiment.

Reference is now made to FIG. 7. FIG. 7 illustrates a 2×2 display wall 200 in which delay is added to the content to be played out by certain displays, according to the techniques depicted in FIG. 6. The display wall 200 includes a top row of displays 210(1) and 210(2) (denoted A1 and A2, and a bottom row of displays 212(1) and 212(2) (denoted B1 and B2). In this example, delay of one frame is added to the scanout of content on displays B1 and B2 such that the images played out at the bottom of the upper displays A1 and A2 are for the same frame number as the images played out at the top of the lower displays B1 and B2, respectively.

Specifically, in the example of FIG. 7, the content supplied to display B1 is delayed by one frame refresh cycle time period such that while A1 content for frame number 485 is played out through lines 542-1080 of display A1, B1 content for frame number 485 is being played out through lines 1-541 of display B1. Similarly, the content supplied to display B2 is delayed by one frame such that while A1 content for frame number 485 is played out through lines 542-1080 of display A2, B2 content for frame number 485 is being played out through lines 1-541 of display B2. The content played out at the bottom of display A1 is synchronized to the content played out at the top of display B1, due to the one frame delay applied to the content supplied to display B1. Likewise, the content played out at the bottom of display A1 is synchronized to the content played out at the top of display B2, due to the one frame delay applied to the content supplied to display B2. Frame 484 is played out at the bottom (lines 542-1080) of display B1 (and similarly at the bottom of frame B2).

To be clear, there is a refresh rate and frame rate. A refresh rate refers to a display refresh cycle, whereas a frame rate refers to content playback rate. A display will only display at the frame rate of the content if the display can support that rate. Ultimately, the refresh rate will dictate the scanout.

It is to be appreciated that the content provided to display screens A1, B1, A2 and B2 are, in most cases, different positional subsets or portions of a content that, when presented in the 2×2 video wall arrangement shown in FIG. 7, collectively form a complete presentation of the content. That is, content supplied to display A1 is content for an upper right-hand portion (quarter) of an overall content, the content supplied to display A2 is for an upper left-hand portion (quarter) of the overall content, content supplied to display B1 is for a lower right-hand portion (quarter) of the overall content, and content supplied to display B2 is for a lower right-hand portion (quarter) of the overall content. Consequently, the content for a given frame number that is supplied to display A1 in most cases may not be the same as the content for the same frame number supplied to display B1, arranged beneath frame A1. The same is true for the content for a frame number of video supplied to display A2 and the content for the same video frame number supplied to display B2. Again, the content for a given frame number supplied to the different displays will be different positional portions (e.g., quarters in the case of a 2×2 video wall) of the overall content to be presented by the display wall.

FIG. 8 illustrates an example of a 3×3 display wall 300. The display wall 300 includes a top row (Row A) of displays 310(1), 310(2) and 310(3) (denoted A1, A2 and A3), a middle row (Row B) of displays 312(1), 312(2) and 312(3) (denoted B1, B2 and B3) and a bottom row (Row C) of displays 314(1), 314(2) and 314(3) (denoted C1, C2 and C3). The content supplied to the displays for the top row are given no (zero) play out delay, the content supplied to the displays for the middle row are given 1 refresh cycle of delay, and the content supplied to the bottom row of the displays are given 2 refresh cycles of delay.

For example, consider play out of frame number 10 of content on displays A1, B1, and C1. Without applying the delay compensation described herein, the top of displays A1, B1 and C1 will all start to play out frame 10, but the bottom of displays A1, B1 and C1 will all still show frame number 9, thereby giving 1 frame or refresh cycle out of sync where the bottom of display A1 meets the top of display B1, and where the bottom of display B1 meets the top of display C1.

In the example of FIG. 8, where frame number 10 is next to play out, when applying the delay adjustment, the top half of the top row of displays (A1, A2, A3) display their respective content for frame 10, the bottom half of the top row of displays (A1, A2, A3) display their respective content for frame 9, the top half of the middle row of displays (B1, B2, B3) display their respective content for frame 9, the bottom half of the middle row of displays (B1, B2, B3 display their respective content for frame 8, the top half of the bottom row of displays (C1, C2, C3) display their respective content for frame 8, and the bottom half of the bottom row of displays (C1, C2, C3) display their respective content for frame 7. As a result, each vertically adjacent display would be in sync.

This delay may be added via the content or by media player adjustment to the content. For example, consider a 4 k video source, a 3×3 video wall as depicted in FIG. 8, and a vertical refresh cycle of 60 Hz. Row A (consisting of screens A1, A2, and A3) would have zero (0) delay, Row B (consisting of display screens B1, B2 and B3) would have one refresh cycle of delay (16.666 ms of delay), and Row C (consisting of display screens C1, C2, and C3) would have two refresh cycles of delay (33.2 . . . ms of delay).

These techniques are applicable to video displays/televisions with any frame rates, 60 fps, 120 fps. The description above uses 60 fps, only by way of example. Furthermore, the delay synchronization techniques presented herein can be used to display media content of any type, not just video content. The term media content is used herein to refer to one or more of video content, graphical content or animation content, or any other suitable frame-based content that can be visually rendered on a display.

Figure 9:
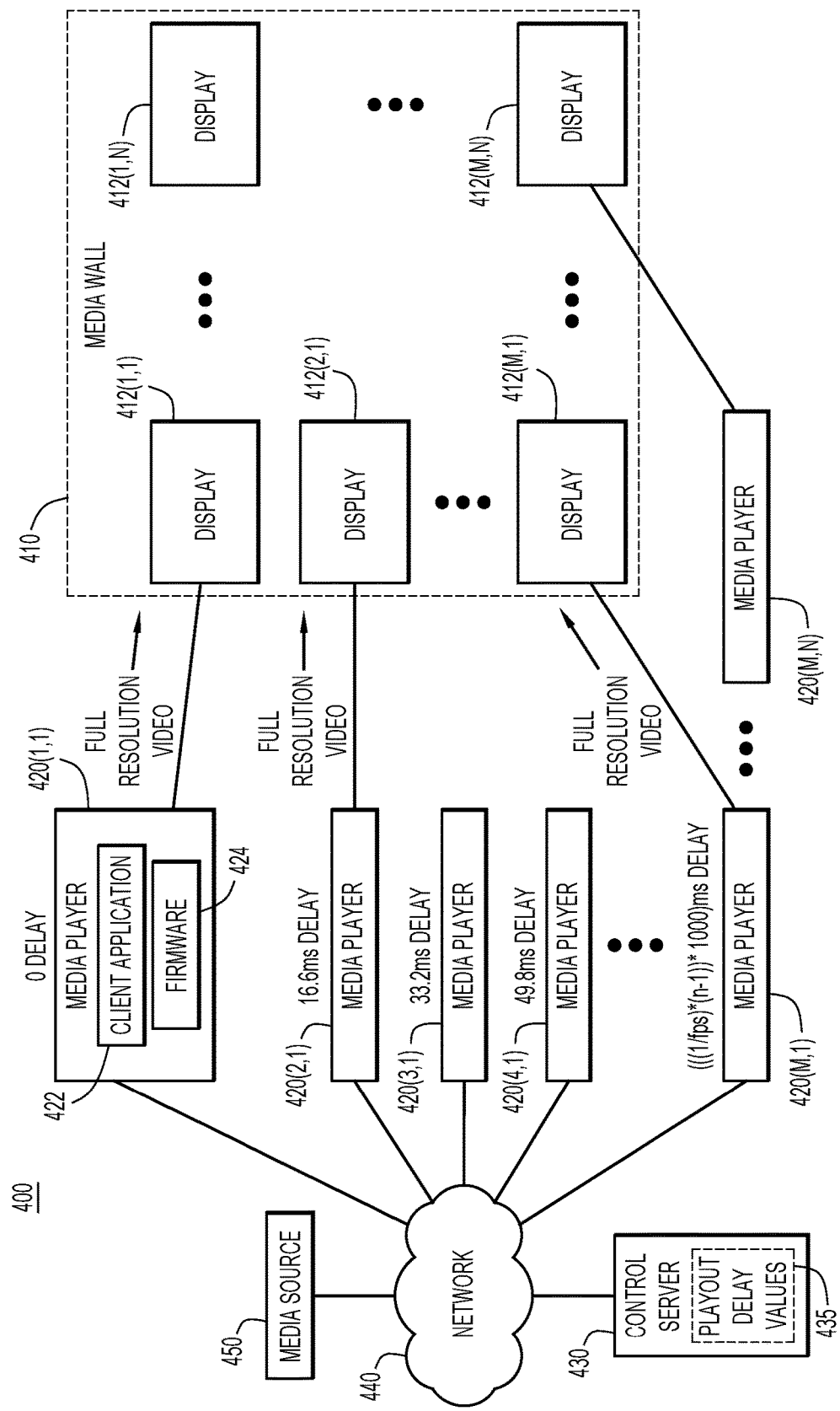
FIG. 9 is a block diagram of a system configured to delay the playout of content, according to an example embodiment.

Referring now to FIG. 9, a block diagram is shown of a system 400 for implementing the display synchronization techniques presented herein, according to an example embodiment. The system 400 includes a plurality displays arranged in one or more adjacent vertical columns, and a plurality of media players. Each media player of the plurality of media players is coupled to a corresponding display of the plurality displays and is configured to play out a corresponding positional subset of an overall media content at a full resolution of the media content and such that collectively the plurality of displays display the overall media content as a single display screen.

More specifically, the system 400 includes a display wall 410 consisting of an (M×N) array of displays 412(1,1)-412(M,N). The system 400 includes media players 420(1,1)-420(M,N) for displays 412(1,1)-412(M,N) such that there is a media player for each display. The media players 420(1,1)-420(M,N) are configured to cooperatively display media content across the display screens 412(1,1)-412(M,N) of the display wall 410. Each media player 420(1,1)-420(M,N) includes a client application 422 and firmware 424 that, together, control the playout of media to a corresponding display screen. The client application 422 of each media player 420(1,1)-420(M,N) is configured to delay the playout of media to its associated display 412(1,1)-412(M,N) based on its vertical position in the display wall, as shown in FIG. 9.

In one form, the media players 420(1,1)-420(M,N) may be configured by way of a control server 430 that stores playout delay values 435 to be used for a given configuration of a display wall 410. The control server 430 communicates with the media players 420(1,1)-420(M,N) by way of network 440. The network 440 may be a local area network or a combination of a wide area network and one or more local area networks. Thus, the control server 430 may reside locally to the media players 420(1,1)-420(M,N) or may be cloud-based. Moreover, the architecture can vary. In one example, all video feeds may originate from a single video player. Further still, the media players 420(1,1)-420(M,N) can communicate with each other to play out without the need for/involvement of the control server 430.

The media that is to be played out via the media players 420(1,1)-420(M,N) may come from a variety of sources, and for simplicity this is shown in FIG. 9 as media source 450. The media source 450 may be local to, or remote from, the physical location of the display wall 410 and media players 420(1,1)-420(M,N). In one example, the media source 450 may be a conference server that coordinates video conference meetings (in which case the media wall may be reside in a video conference room). In another example, the media source 450 may be any source of media content, such as broadcast content, streaming media content (on various program channels), custom generated media content (such as advertising content), etc.

As shown in FIG. 9, the media players 420(1,1)-420(M, N) are configured with a playout delay such that the media player(s) 420(1,1)-420(M,1) for the top most row of displays 412(1,1)-412(M,1) of the display wall 410 are configured to apply zero (0) delay, the media player(s) 420(2,1)-420(2,N) for the second row of displays 412(2,1)-412(2,N) are configured to apply one (1) frame scanout delay (e.g., 16.6 . . . ms for a 60 fps frame rate), the media player(s) 420(3,1)-420(3,N) for the third row of displays 412(3,1)-412(3,N) are configured to apply two (2) frames of scanout delay (e.g., 33.2 . . . ms for a 60 fps frame rate), the media player(s) 420(4,1)-420(4,N) for the fourth row of displays 412(4,1)-412(4,N) are configured to apply three (3) frames of scanout delay (e.g., 50.0 . . . ms for a 60 fps frame rate), and so on. In general, as shown in FIG. 9, as expressed in absolute ms values, the delay that a given row of media players are configured to apply is $(((1/fps)*(n-1))*1000)$ ms, where n is the vertical array position number of the display screen in the column from top to bottom and fps=frame refresh rate. The frame rate can be any value.

Thus, as depicted in FIG. 9, each of the plurality of media players is configured to play out the corresponding subset of the media content, with a corresponding delay, to the corresponding display arranged in the one or more adjacent vertical columns to compensate for scan out lag associated with the media content, wherein the corresponding delay is $(((1/fps)*(n-1))*1000)$, where n is a vertical position number of a display in the one or more columns from top to bottom, and fps is a frame refresh rate of the media content.

The system arrangement depicted in FIG. 9 achieves display of media content on each of the respective displays of the display wall 410 at a full resolution of the source media content. For example, if the content is 4 k resolution, and each display is 4 k capable, then the media content provided by the media player to each respective display will be the full 4 k resolution. This is due to the fact that each display is driven by a dedicated media player and operating on full resolution of the content.

The client application 422 running on each media player 420(1,1)-420(M,N) may be a Hypertext Markup Language (HTML)-based application that performs the delaying of playout for aligning and syncing the displays in the vertical columns of the display wall 410.

Figure 10:
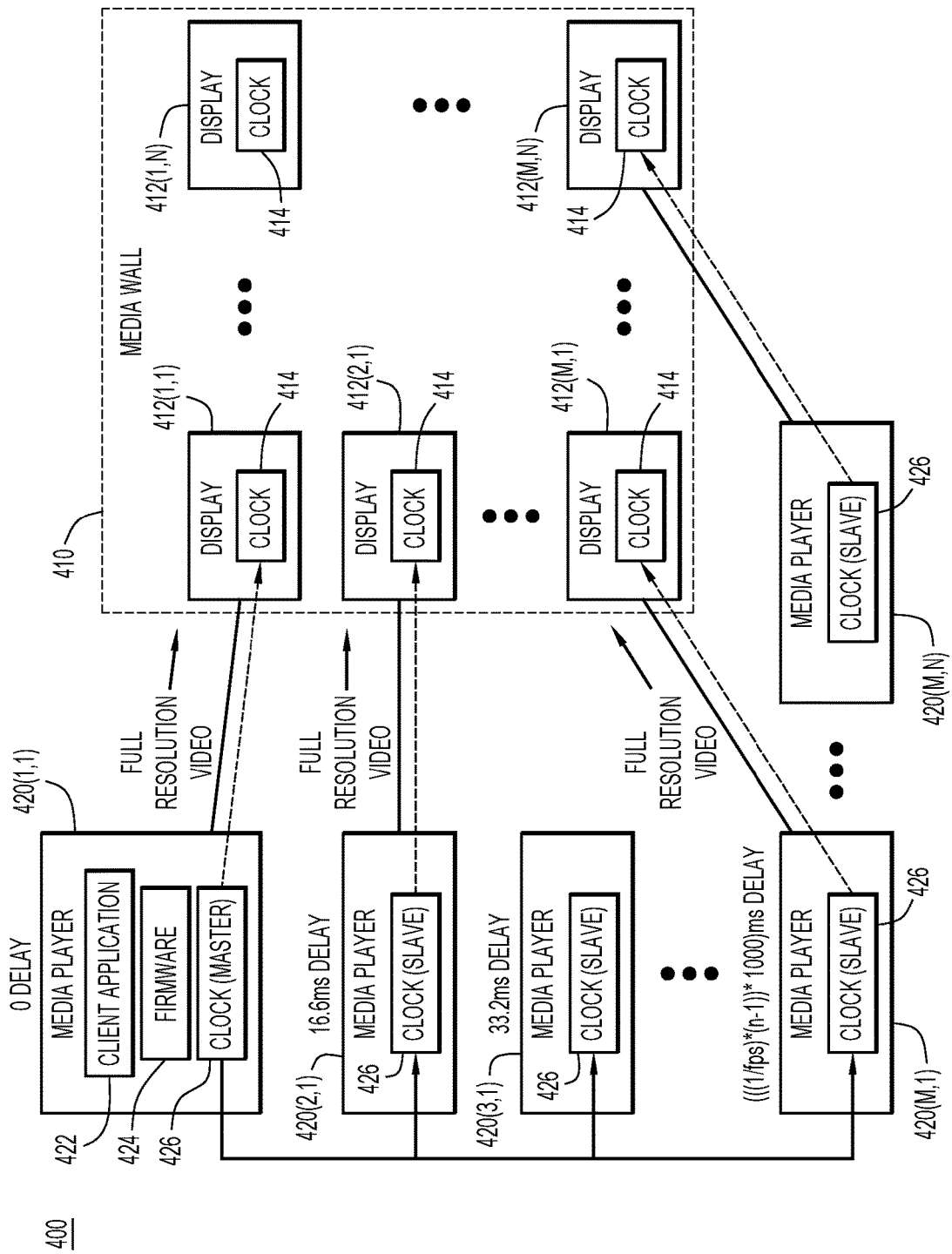
FIG. 10 is a more detailed block diagram of the system of FIG. 8, and illustrating the slaving of clocks among a plurality of media players, and between media players and respective displays, according to an example embodiment.

Reference is now made to FIG. 10. FIG. 10 illustrates additional aspects of the system 400. In particular, each media player 420(1,1)-420(M,N) further includes a clock 426 and at least a first of the media players, e.g., media player 420(1,1), is coupled to each of the other media players of the plurality of media players 420(1,1)-420(M,N). Moreover, the clock 426 of the media player 420(1,1) serves as a master clock for the other media players. That is, the master clock 426 of the media player 420(1,1) slaves the clocks 426 of the other media players of the plurality of media players 420(1,2)-420(M,N) so that the clocks of the plurality of media players are synchronized (to the clock of media player 420(1,1)).

Furthermore, each display 412(1,1)-412(M,N) includes a clock 414 that is used to synchronize operation of the display, such as vertical sync, etc. The clock 426 of each of the plurality of media players 420(1,1)-420(M,N) slaves a clock 414 in the corresponding display. That is, the clock 426 of media player 420(1,1) slaves the clock 414 of display 412(1,1), clock 426 of media player 420(2,1) slaves the clock 414 of display 412(2,1), and so on.

Using this clock slaving/synchronizing scheme, all of the media players are synchronized to each other, and each media player synchronizes its clock to the clock of its associated display. This ensures synchronization of the playout of media on the displays 412(1,1)-412(M,N), with the delay offset applied in the vertical columns of displays, as described herein.

Again, each display in the display wall 410 is independent and has its own clock (vertical sync clock). Each media player slaves its associated display to that media player's internal clock. This synchronization arrangement allows the use of any type of display technology in the display wall 410. A single media player may serve as the clock master to all the clocks of the other media players, and each media player slaves the clock of its respective display. This allows also for synchronization across (M,N) number of displays, which may be from different manufacturers and use different display technologies. Some displays may be Liquid Crystal Displays (LCDs), projectors, Light Emitting Diode (LED) displays, etc. The system 400 can synchronize different display output types.

Figure 11:
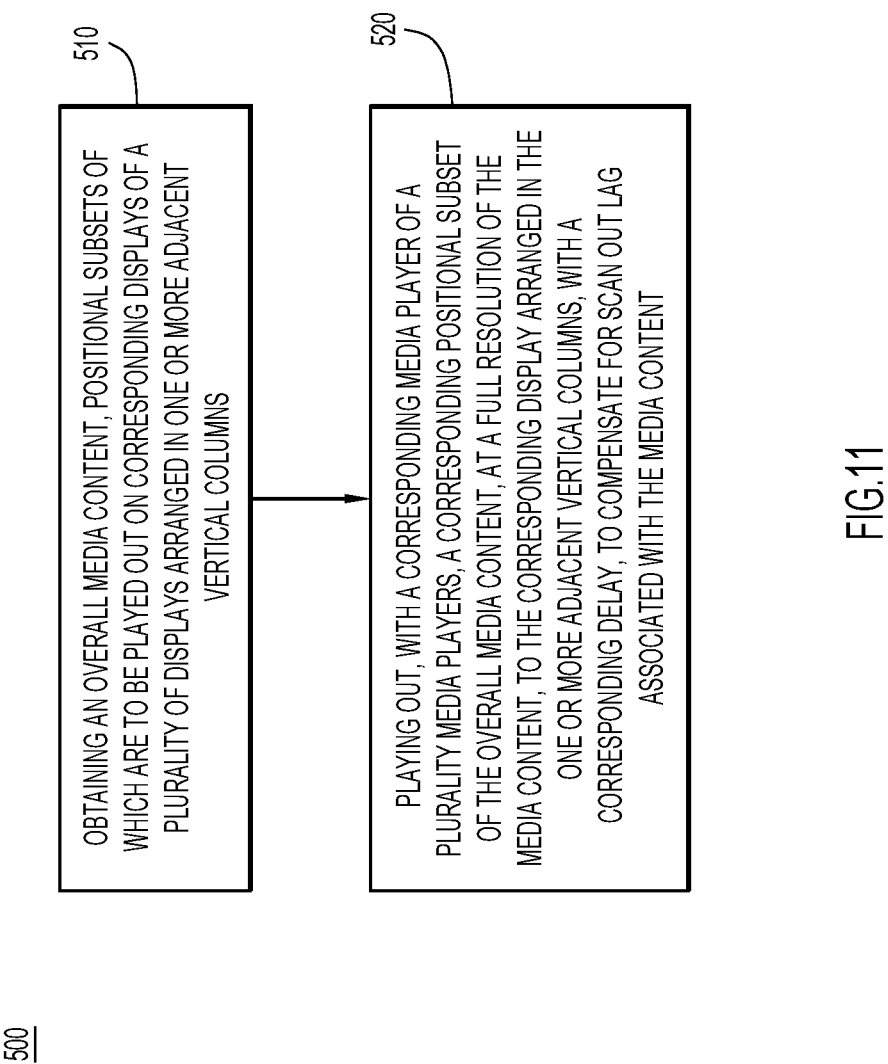
FIG. 11 is a flow chart depicting a method for delaying the playout of content, according to an example embodiment.

Turning now to FIG. 11, a flow chart is shown for a method 500 according to an example embodiment. The method 500 includes, at operation 510, obtaining an overall media content, positional subsets of which are to be played out by corresponding displays of a plurality of displays arranged in one or more adjacent vertical columns. At operation 520, the method 500 includes playing out, with a corresponding media player of a plurality media players, a corresponding positional subset of the overall media content, at a full resolution of the media content, to the corresponding display arranged in the one or more adjacent vertical columns, with a corresponding delay to compensate for scan out lag associated with the media content. In one form, the corresponding delay may be $(((1/fps)*(n-1))*1000)$, where n is a vertical position number of a display in the one or more adjacent vertical columns from top to bottom, and fps is a frame refresh rate of the media content, and such that collectively the plurality of displays display the overall media content as a single display. The media content provided by a respective media player to the corresponding display is a positional portion of an overall media content to be collectively displayed by the plurality of displays. The media content may be one or more of video content, graphical content or animation content.

As depicted in FIG. 10, at least a first media player of the plurality of media players is coupled to each other media player of the plurality of media players, wherein each media player includes a clock, the clock of a first media player of the plurality of media players serves as a master clock. Thus, the method 500 may further include slaving the clocks for the plurality of media players using the master clock such that the clocks of the plurality of media players are synchronized to the master clock. Further still, the method may include each clock of the plurality of media players slaving a clock in the corresponding display.

The method 500 may further include storing at a control server or a particular media player of the plurality of media players, data for the corresponding delay to be applied by respective ones of the plurality of media players.

In summary, current methods to create a perfect visually synchronized presentation across multiple displays require the loss of resolution. Presented herein is a method to retain full resolution (if desired) across all screens and achieve perfect visual sync, such that all screens in a video wall act and look like a single screen.

Figure 12:
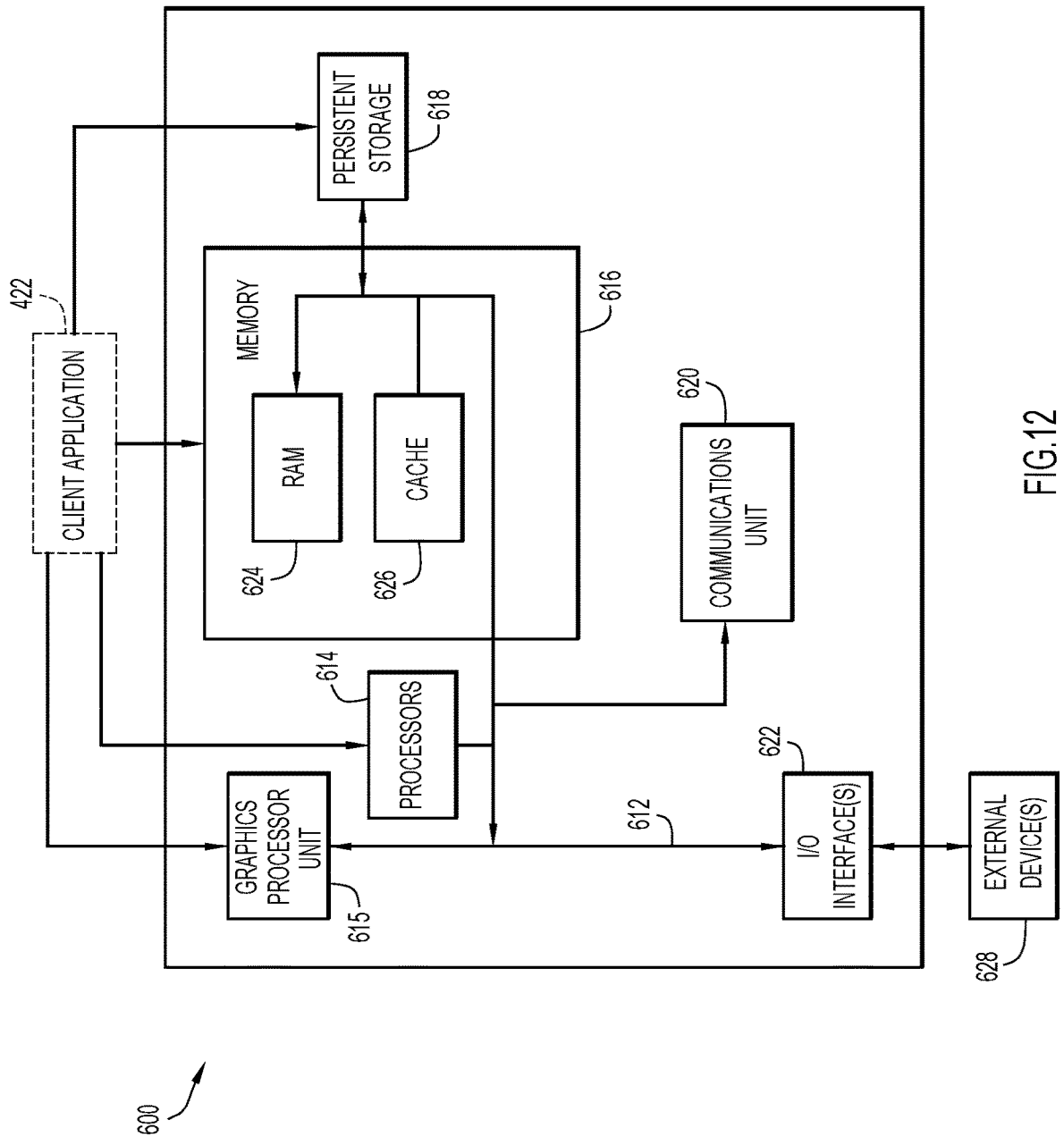
FIG. 12 is a block diagram of a computing device configured to perform the operations presented herein.

FIG. 12 is a block diagram of a computing device 600 that may be configured to perform the operations of a media player, such as the video players 420(1,1)-420(M,N). As depicted, the device 600 includes a bus 612, which provides communications among computer processor(s) 614, a graphics processor unit 615, memory 616, persistent storage 618, communications unit 620 and input/output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media. In the depicted embodiment, memory 616 includes random access memory (RAM) 624 and cache memory 626. In general, memory 616 can include any suitable volatile or non-volatile computer readable storage media. Instructions for the client application 422 may be stored in memory 616 or persistent storage 618 for execution by processor(s) 614. The processor(s) 614 perform the operations described herein when the instructions for the client application 422 are executed. The processor 614 is used for control functions of the client application 422, whereas the graphics processor unit 615 is used for video rendering operations of the client application 422. Thus, as depicted by the arrows from client application 422, the client application 422 runs on the processor 614, the graphics processor unit 615, and uses memory in RAM 624 and exists in persistent storage 618.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include NAND flash memory.

Communications unit 620, in these examples, provides for communications with other data processing systems or devices. In these examples, communications unit 620 may include one or more wired or wireless network interface cards and components.

I/O interface(s) 622 allows for input and output of data with other devices that may be connected to computer device 600. For example, I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one form, a system is provided comprising: a plurality of displays being arranged in one or more adjacent vertical columns; and a plurality of media players, each media player of the plurality of media players being coupled to a corresponding display of the plurality of displays and configured to play out a corresponding positional subset of an overall media content at a full resolution of the media content and such that collectively the plurality of displays display the overall media content as a single display; wherein each of the plurality of media players is configured to play out the corresponding positional subset of the media content, with a corresponding delay, to the corresponding display arranged in the one or more adjacent vertical columns to compensate for scan out lag associated with the media content.

In another form, a method is provided comprising: obtaining an overall media content, positional subsets of which is to be played out corresponding displays of a plurality of displays arranged in one or more adjacent vertical columns; and playing out, with a corresponding media player of a plurality of media players, a corresponding positional subset of the overall media content, at a full resolution of the media content, to the corresponding display arranged in the one or more adjacent vertical columns, with a corresponding delay to compensate for scan out lag associated with the media content.

In still another form, a system comprising: a plurality of media players, each media player of the plurality of media players configured to be coupled to a corresponding display of a plurality displays and configured to play out a corresponding positional subset of an overall media content at a full resolution of the media content and such that collectively the plurality of displays display the overall media content as a single display; wherein each of the plurality of media players is configured to play out the corresponding positional subset of the media content, with a corresponding delay, to the corresponding display arranged in one or more adjacent vertical columns, to compensate for scan out lag associated with the media content.

As described above, the corresponding delay may be $(((1/fps)*(n-1))*1000)$, where n is a vertical position number of a display in the one or more adjacent vertical columns from top to bottom, and fps is a frame refresh rate of the media content.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a plurality of displays being arranged in one or more adjacent vertical columns; and
   a plurality of media players, each media player of the plurality of media players being coupled to a corresponding display of the plurality of displays and configured to play out a corresponding positional subset of media content at a full resolution of the media content and such that collectively the plurality of displays display the media content as a single display;
   wherein each of the plurality of media players is configured to play out the corresponding positional subset of the media content, with a corresponding delay, to the corresponding display arranged in the one or more adjacent vertical columns to compensate for a time lag between an updating of a first line of a second display above the corresponding display in a vertical column, and an updating of a last line of the second display.

2. The system of claim 1, wherein the corresponding delay is $(((1/fps)*(n-1))*1000)$, where n is a vertical position number of the corresponding display in the one or more adjacent vertical columns from top to bottom, and fps is a frame rate of the media content.

3. The system of claim 1, wherein at least a first media player of the plurality of media players is coupled to each other media player of the plurality of media players, wherein each media player includes a clock, and wherein the clock of a first media player of the plurality of media players serves as a master clock that slaves the clocks for the plurality of media players and such that the clocks of the plurality of media players are synchronized to the master clock.

4. The system of claim 3, wherein the clock of each of the plurality of media players slaves a clock in the corresponding display.

5. The system of claim 1, wherein the media content is one or more of video content, graphical content or animation content.

6. The system of claim 1, wherein two or more displays of the plurality of displays are of different technology type or different manufacturer.

7. The system of claim 1, wherein the corresponding positional subset of the media content provided by a respective media player to the corresponding display is a positional portion of the media content to be collectively displayed by the plurality of displays.

8. The system of claim 1, further comprising a control server in communication with the plurality of media players, and wherein the control server is configured to store data for the corresponding delay to be applied by respective ones of the plurality of media players.

9. A method comprising:
   obtaining media content, positional subsets of which is to be played out on corresponding displays of a plurality of displays arranged in one or more adjacent vertical columns; and
   playing out, with a corresponding media player of a plurality of media players, a corresponding positional subset of the media content, at a full resolution of the media content, to the corresponding display arranged in the one or more adjacent vertical columns, with a corresponding delay to compensate for a time lag between an updating of a first line of a second display above the corresponding display in a vertical column, and an updating of a last line of the second display.

10. The method of claim 9, wherein the corresponding delay is $(((1/fps)*(n-1))*1000)$, where n is a vertical position number of the corresponding display in the one or more adjacent vertical columns from top to bottom, and fps is a frame rate of the media content.

11. The method of claim 9, wherein at least a first media player of the plurality of media players is coupled to each other media player of the plurality of media players, wherein each media player includes a clock, the clock of a first media player of the plurality of media players serves as a master clock, and further comprising:

slaving the clocks for the plurality of media players using the master clock such that the clocks of the plurality of media players are synchronized to the master clock.

12. The method of claim 10, further comprising:

each clock of the plurality of media players slaving a clock in the corresponding display.

13. The method of claim 9, wherein the media content is one or more of video content, graphical content or animation content.

14. The method of claim 9, wherein two or more displays of the plurality of displays are of different technology type or different manufacturer.

15. The method of claim 9, wherein the corresponding positional subset of the media content provided by a respective media player to the corresponding display is a positional portion of the media content to be collectively displayed by the plurality of displays.

16. The method of claim 9, further comprising storing at a control server or a particular media player of the plurality of media players, data for the corresponding delay to be applied by respective ones of the plurality of media players.

17. A system comprising:

a plurality of media players, each media player of the plurality of media players configured to be coupled to a corresponding display of a plurality displays and configured to play out a corresponding positional subset of media content at a full resolution of the media content and such that collectively the plurality of displays display the media content as a single display;

wherein each of the plurality of media players is configured to play out the corresponding positional subset of the media content, with a corresponding delay, to the corresponding display arranged in one or more adjacent vertical columns, to compensate for a time lag between an updating of a first line of a second display above the corresponding display in a vertical column, and an updating of a last line of the second display.

18. The system of claim 17, wherein the corresponding delay is $(((1/fps)*(n-1))*1000)$, where n is a vertical position number of the corresponding display in the one or more adjacent vertical columns from top to bottom, and fps is a frame rate of the media content.

19. The system of claim 17, wherein at least a first media player of the plurality of media players is coupled to each other media player of the plurality of media players, wherein each media player includes a clock, and wherein the clock of a first media player of the plurality of media players serves as a master clock that slaves the clocks for the plurality of media players and such that the clocks of the plurality of media players are synchronized to the master clock.

20. The system of claim 19, wherein the clock of each of the plurality of media players slaves a clock in the corresponding display.

\* \* \* \* \*